Patented Dec. 2, 1952

2,620,332

UNITED STATES PATENT OFFICE 2,620,332

MONOAZO DYESTUFFS

Willy Widmer, Bottmingen, and Ernst Reich, Neuewelt, near Basel, Switzerland, assignors to Ciba Limited, Basel, Switzerland, a Swiss firm No Drawing. Application August 29, 1949, Serial No. 113,025. In Switzerland September 3, 1948

4 Claims. (Cl. 260—201)

According to this invention valuable new monoazo dyestuffs are made by coupling a diazotized 4-nitro-6-acylamino-2-amino-1-hydroxybenzene with 2:8-dihydroxynaphthalene-6-sulfonic acid.

The acyl radical present in the 4-nitro-6-acylamino-2-amino-1-hydroxybenzenes used as starting materials may be, for example, of aromatic or aliphatic nature. Among others, the following acyl radicals come into consideration: The benzoyl, meta- or para-nitrobenzoyl, para-chlorobenzoyl, phthaloyl, benzenesulfonyl or para-toluene-sulfonyl, acetyl, propionyl or butyryl radical, or a carbalkoxy radical of the formula alkyl-O—CO—.

Very valuable dyestuffs are obtained from 4-nitro - 6 - acylamino - 2 - amino - 1 - hydroxybenzenes of the formula

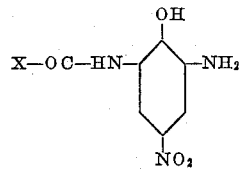

in which X represents a hydrocarbon radical having at most 6 carbon atoms, and especially from 4-nitro-6-acetylamino-2-amino-1-hydroxybenzene.

The diazotization of the 4-nitro-6-acylamino-2-amino-1-hydroxybenzenes may be carried out by the usual known methods, for example, with the aid of a mineral acid, and especially hydrochloric acid and sodium nitrite.

The coupling is advantageously conducted in a neutral to alkaline medium, preferably in an alkaline medium. For example, it may be conducted in a medium rendered alkaline with an alkali metal carbonate, an alkali metal hydroxide or an alkaline earth metal hydroxide.

In the present process there are obtained, depending on the choice and quantity of the alkali used for the coupling reaction, dyestuffs which differ from one another in certain properties, but which all possess very good properties of fastness. Thus, for example, there are obtained by coupling in the presence of calcium hydroxide or in the presence of a large excess of sodium hydroxide, dyestuffs which dissolve in concentrated sulfuric acid with a bordeaux red to brownish-bordeaux red coloration and yield on wool after-chromed dyeings having grey tints, whereas by coupling with the mono-sodium salt of 2:8-dihydroxy naphthalene-6-sulfonic acid in the presence of about one equivalent of sodium hydroxide or magnesium hydroxide dyestuffs are obtained which dissolve in concentrated sulfuric acid with a violet coloration and yield on wool after-chromed dyeings having olive-green tints. This difference can be explained by the fact that 2:8-dihydroxynaphthalene-6-sulfonic acid is capable of coupling in two ortho-positions to a hydroxyl group, namely in the 1-position and in the 7-position, and that coupling in one or other of these positions is favored depending on the choice and quantity of the addition necessary for the coupling reaction, so that mixtures of two dyestuffs are obtained in which the one or the other component may prevail.

The invention also includes a modification of the process described above: The dyestuffs of the invention can in part be obtained by treating monoazo dyestuffs of the general formula

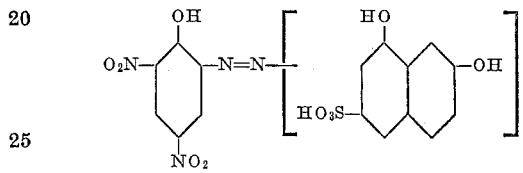

in which the azo group is linked to the naphthalene nucleus in ortho-position to a hydroxyl group, so as to reduce to an amino group the nitro group in ortho-position to the hydroxyl group, and then to convert the resulting amino group into an acyl amino group.

The monoazo dyestuffs of the above formula used as starting materials in this modification of the process can be prepared, for example, by coupling a diazotized 4:6-dinitro-2-amino-1-hydroxybenzene with 2:8-dihydroxynaphthalene-6-sulfonic acid. The reduction of the dinitroazo dyestuffs to the nitro-amino-azo dyestuffs is conducted under conditions such that neither the azo group nor the second nitro group is attacked.

For this purpose there are suitable, for example, alkali metal sulfides or alkali metal hydrosulfides.

Conversion of the amino group into the acylamino group in the dyestuffs so obtained may be brought about for example by means of acid halides such as acid chlorides, or by means of acid anhydrides. There may be introduced into the dyestuff molecule, among others, the acyl radicals hereinbefore mentioned as acyl radicals which may be present in the diazo components used as starting materials in the process first mentioned above.

The new monoazo dyestuffs obtainable by either of the foregoing processes correspond to the formula

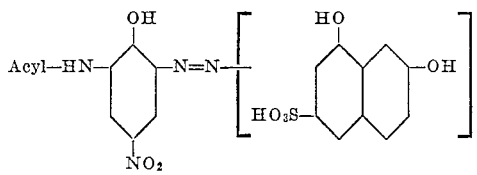

in which the azo group is linked to the naphthalene nucleus in ortho-position to a hydroxyl group, that is to say to the position 1 or 7 of the radical of the 2:8-dihydroxynaphthalene-6-sulfonic acid.

The new dyestuffs can be used for dyeing or printing a very wide variety of materials. They can be treated with agents yielding metal, especially agents yielding chromium; the treatment with an agent yielding metal may be conducted by known methods in substance or on the fiber. Treatment with an agent yielding chromium in substance may be carried out, for example, with a salt of trivalent chromium. In this connection, however, it must be stated that at the high temperatures (100° C. or higher) usually necessary for this reaction it is often disadvantageous to work in a mineral acid medium, because the acylamino group present in the dyestuff molecule may be hydrolyzed under such conditions. In such cases it is advisable to use as an agent yielding chromium a chromium salt of a weak acid such as the formate or acetate.

Especially valuable results are obtained when the dyestuffs are treated on the fiber with agents yielding metal, especially agents yielding chromium. In this way very valuable dyeings can be produced on materials of animal origin, such as leather, silk and above all wool, but also on artificial fibers of superpolyamides or superpolyurethanes. Treatment on the fiber may be conducted, for example, by the known afterchroming process.

The following examples illustrate the invention, the parts and percentages being by weight unless otherwise stated and the relationship of parts by weight to parts by volume being the same as that of the kilogram to the litre:

*Example 1*

21.1 parts of 4-nitro-6-acetylamino-2-amino-1-hydroxybenzene are suspended in 100 parts of water and, after the addition of 20 parts of hydrochloric acid of 30 per cent. strength and ice, diazotized in the usual manner at 5-10° C. with 25 parts by volume of a 4 N-solution of sodium nitrite. The suspension of the diazo compound is neutralized by the addition of sodium carbonate and then filtered. The filter cake so obtained is introduced into a mixture, cooled with ice to 0° C., of 50 parts of water, 20 parts of magnesium chloride (MgCl₂.6H₂O), 26.6 parts of sodium hydroxide solution of 30 per cent. strength and 27.5 parts of sodium 2:8-dihydroxynaphthalene-6-sulfonate. The whole is stirred while allowing the temperature to rise to 15° C. until the formation of dyestuff ceases. The precipitated dyestuff is separated by filtration and dried. This dyestuff corresponds to the formula

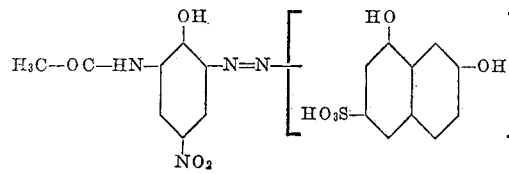

in which the azo group is linked to the naphthalene nucleus in ortho-position to a hydroxyl group. It is a brown-black powder which dissolves in dilute sodium carbonate solution with a violet grey coloration and in concentrated sulfuric acid with a violet coloration, and dyes wool from an acid bath grey tints which are converted by after-chroming into uniform olive tints of very good fastness to light and washing.

By coupling the diazo compound obtained from 21.1 parts of 4-nitro-6-acetylamino-2-amino-1-hydroxybenzene by introducing it into a mixture, cooled with ice to 0° C., of 27.5 parts of sodium 2:8-dihydroxynaphthalene-6-sulfonate, 75 parts of water and 13 parts of sodium hydroxide solution of 30 per cent. strength, a dyestuff is obtained which dissolves in concentrated sulfuric acid with a violet coloration and dyes wool by the after-chroming process more greenish olive tints than the dyestuff obtained as described in the first paragraph of this example.

If there are used in the coupling operation instead of 13 parts of sodium hydroxide solution of 30 per cent. strength, 10 parts of milk of lime having a content of 40 per cent. of Ca(OH)₂, there is obtained a dyestuff which dissolves in concentrated sulfuric acid with a bordeaux red coloration and dyes wool grey tints by the afterchroming process.

*Example 2*

27.3 parts of 4-nitro-6-benzoylamino-2-amino-1-hydroxybenzene are suspended in 100 parts of water, and after the addition of 15 parts of hydrochloric acid of 30 per cent. strength and ice, diazotized in the usual manner at 0-10° C. with 25 parts by volume of a 4 N-solution of sodium nitrite. The mixture is neutralized by the addition of sodium carbonate and then the diazo compound is separated by filtration. The filter cake so obtained is gradually introduced into a solution, cooled with ice to 0-5° C., of 27.5 parts of sodium 2:8 - dihydroxynaphthalene-6-sulfonate, 50 parts of water and 7.5 parts of sodium hydroxide solution of 30 per cent. strength, a further 6 parts of sodium hydroxide solution of 30 per cent. strength being added simultaneously. The whole is further stirred while allowing the temperature to rise slowly to room temperature until the formation of dyestuff ceases. By the addition of sodium chloride precipitation of the dyestuff is completed, and the latter is separated by filtration, washed with sodium chloride solution of 10 per cent. strength and dried. This dyestuff corresponds to the formula

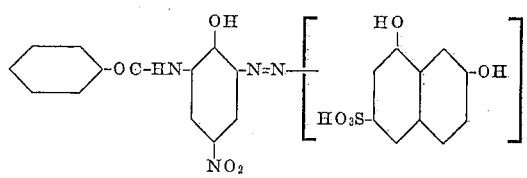

in which the azo group is linked to the naphthalene nucleus in ortho-position to a hydroxyl group. It is a black-brown powder which dissolves in dilute sodium carbonate solution with a bluish violet coloration and in concentrated sulfuric acid with a violet coloration and dyes wool by the after-chroming process olive tints which are fast to light and washing.

By using in this example 23.9 parts of 4-nitro-6 - n-butyryl-amino-2-amino-1-hydroxybenzene, instead of 27.3 parts of 4-nitro-6-benzoylamino- 2-amino-1-hydroxybenzene, there is obtained a dyestuff which corresponds to the formula

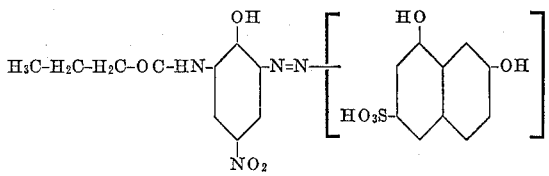

in which the azo group is linked to the naphthalene nucleus in ortho-position to a hydroxyl group. It dissolves in dilute sodium carbonate solution with a greenish violet coloration and in concentrated sulfuric acid with a violet coloration, and dyes wool by the after-chroming process olive tints which are fast to light and washing.

*Example 3*

19.9 parts of 4:6-dinitro-2-amino-1-hydroxybenzene are suspended in 70 parts of water, and, after the addition of 15 parts of hydrochloric acid of 30 per cent. strength, diazotized at 10–15° C. with 25 parts by volume of a 4 N-solution of sodium nitrite, the whole being cooled by the addition of ice. The mixture is neutralized with sodium carbonate, mixed with 20 per cent. of its volume of sodium chloride, and then the diazo compound is separated by filtration. The filter cake is slowly introduced into a solution cooled to 0–5° C. with ice, of 27.5 parts of sodium 2:8-dihydroxynaphthalene-6-sulfonate, 50 parts of water and 13.5 parts of sodium hydroxide solution of 30 per cent. strength. Stirring is continued while allowing the temperature to rise slowly to 10–15° C. until the formation of dyestuff ceases. The precipitated dyestuff, which corresponds to the formula

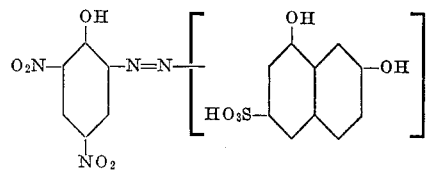

in which the azo group is linked to the naphthalene nucleus in ortho-position to a hydroxyl group, is separated by filtration, washed with sodium chloride solution of 10 per cent. strength and the filter cake is stirred in 150 parts of water. The suspension is mixed with a quantity of sodium hydroxide solution just sufficient to give a reaction alkaline to Brilliant Yellow paper, then heated to 65° C. and mixed with a mixture of 12.5 parts of sodium hydrosulfide and 5.5 parts of calcium chloride and 25 parts of water. In a short time the partial reduction is complete. The reduction mixture is rapidly cooled, rendered acid to Congo with hydrochloric acid, and the reaction product is separated by filtration and washed with water. The filter cake is stirred in 500 parts of water at 80–85° C. and the suspension of the partially reduced dyestuff is mixed with sodium carbonate to give a reaction alkaline to Brilliant Yellow paper, whereby the dyestuff dissolves. It is freed from sulfur and calcium carbonate by filtration, and precipitated from the solution by the addition of sodium chloride and if desired hydrochloric acid, and separated by filtration. The filter cake is suspended in 200 parts of water at 40° C. and sodium hydroxide solution is added to the mixture just until it has an alkaline reaction to Brilliant Yellow paper. 30 parts of acetic anhydride are then run in slowly while the mixture is gradually heated to 50° C. and, after cooling, the precipitated dyestuff acetylated in the amino group is separated from the acetic acid reaction mixture by filtration. The dyestuff is purified by dissolution in dilute sodium carbonate solution followed by precipitation from the alkaline solution by the addition of sodium chloride. In the dry state it is a brown-black powder which dissolves in dilute sodium carbonate solution with a violet-grey coloration and in concentrated sulfuric acid with a violet-red coloration, and dyes wool by the after-chroming process grey tints having an olive shade which are fast to light and washing.

*Example 4*

100 parts of well wetted wool are entered at 60° C. into a dyebath containing in 4000 parts of water, 1.5 parts of the dyestuff obtainable as described in the first paragraph of Example 1, 4 parts of acetic acid of 40 per cent. strength and 10 parts of a crystalline sodium sulfate. The temperature is raised to the boil in the course of 30 minutes and dyeing is carried on for 45 minutes at the boil. 5 parts of sulfuric acid of 10 per cent. strength are then added and dyeing is continued for a further 15 minutes. The dyebath is cooled to about 70° C., 1 part of potassium bichromate is added, the whole is raised to the boil and chroming is carried on at the boil for about 40 minutes. The wool is dyed an olive tint, and the dyeing is of very good fastness to washing and light.

What is claimed is:

1. A monoazo dyestuff of the formula

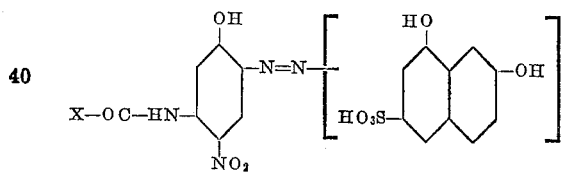

in which the azo group is linked to the naphthalene nucleus in ortho-position to a hydroxyl group and X stands for a hydrocarbon radical containing up to six carbon atoms.

2. A monoazo dyestuff of the formula

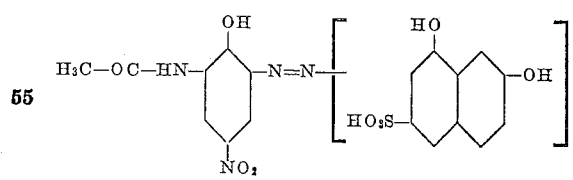

in which the azo group is linked to the naphthalene nucleus in ortho-position to a hydroxyl group.

3. A monoazo dyestuff of the formula

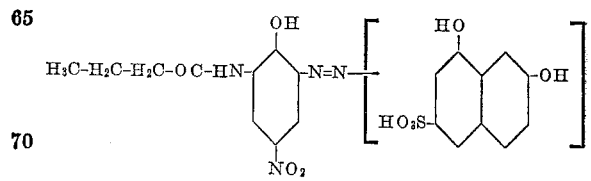

in which the azo group is linked to the naphthalene nucleus in ortho-position to a hydroxyl group.

4. A monoazo dyestuff of the formula

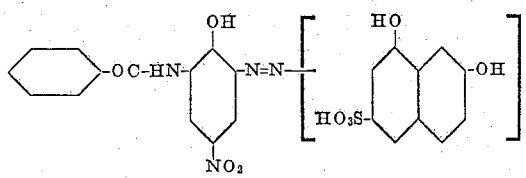

in which the azo group is linked to the naphthalene nucleus in ortho-position to a hydroxyl group.

WILLY WIDMER.
ERNST REICH.

REFERENCES CITED

The following references are of record in the file of this patent:

UNITED STATES PATENTS

| Number | Name | Date |
|---|---|---|
| 792,032 | Herzberg | June 13, 1905 |
| 906,421 | Herzberg et al. | Dec. 8, 1908 |
| 2,353,675 | Knecht et al. | July 18, 1944 |

FOREIGN PATENTS

| Number | Country | Date |
|---|---|---|
| 3,182 | Great Britain | 1903 |
| 3,096 | Great Britain | 1904 |
| 26,383 | Great Britain | 1905 |
| 421,421 | Great Britain | Dec. 20, 1934 |